Figure 1:
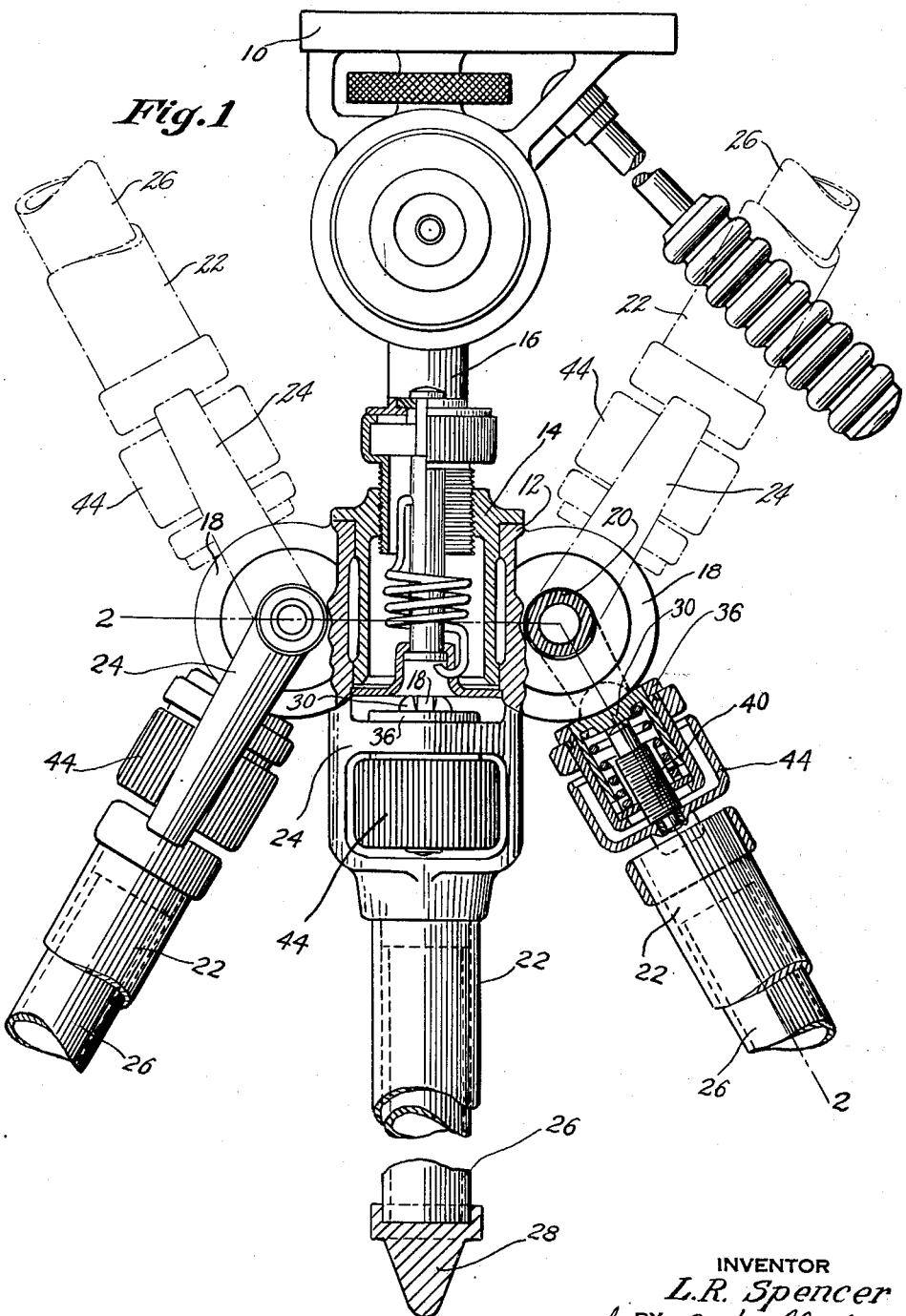

Oct. 12, 1954

L. R. SPENCER 2,691,501

TRIPOD SUPPORT

Filed Jan. 4, 1951

2 Sheets-Sheet 2

INVENTOR
L. R. Spencer
BY
Joseph M. Schofield
ATTORNEY

Patented Oct. 12, 1954

2,691,501

UNITED STATES PATENT OFFICE 2,691,501

TRIPOD SUPPORT

Louis R. Spencer, West Hartford, Conn.

Application January 4, 1951, Serial No. 204,378

3 Claims. (Cl. 248—168)

This invention relates to instrument supporting tripods and more particularly to simple and quick means for frictionally but securely clamping the adjustable legs of the support when in the desired adjusted position.

An object of importance of the invention is that the support has three pivotally mounted legs on a central supporting member, there being frictional engaging members mounted in the legs bearing against individual arcuate wedge shaped projections on the central supporting member.

Another object of importance is that the frictional engaging members may be forced by manually operated threaded means firmly into wedging contact with the arcuate projections so that V-shaped slots formed in the frictional engaging members may fit closely against and be wedged into contact respectively with the wedge shaped surfaces on the arcuate projections.

The tripod forming the present invention is adapted primarily for cameras, surveying instruments, range finders, etc. requiring a firm and steady support with the legs adjusted to widely different positions on irregular surfaces adapted to be securely clamped in any adjusted position.

With the above and other objects in view, the invention may include the features of construction and operation set forth in the following specification and illustrated in the accompanying drawings.

In the accompanying drawings annexed hereto and forming a part of this specification, I have shown the invention embodied in a tripod support adapted primarily for surveying instruments, etc. but it will be understood that the invention can be otherwise embodied and that the drawings are not to be construed as defining or limiting the scope of the invention, the claims appended to this specification being relied upon for that purpose.

Figure 2:
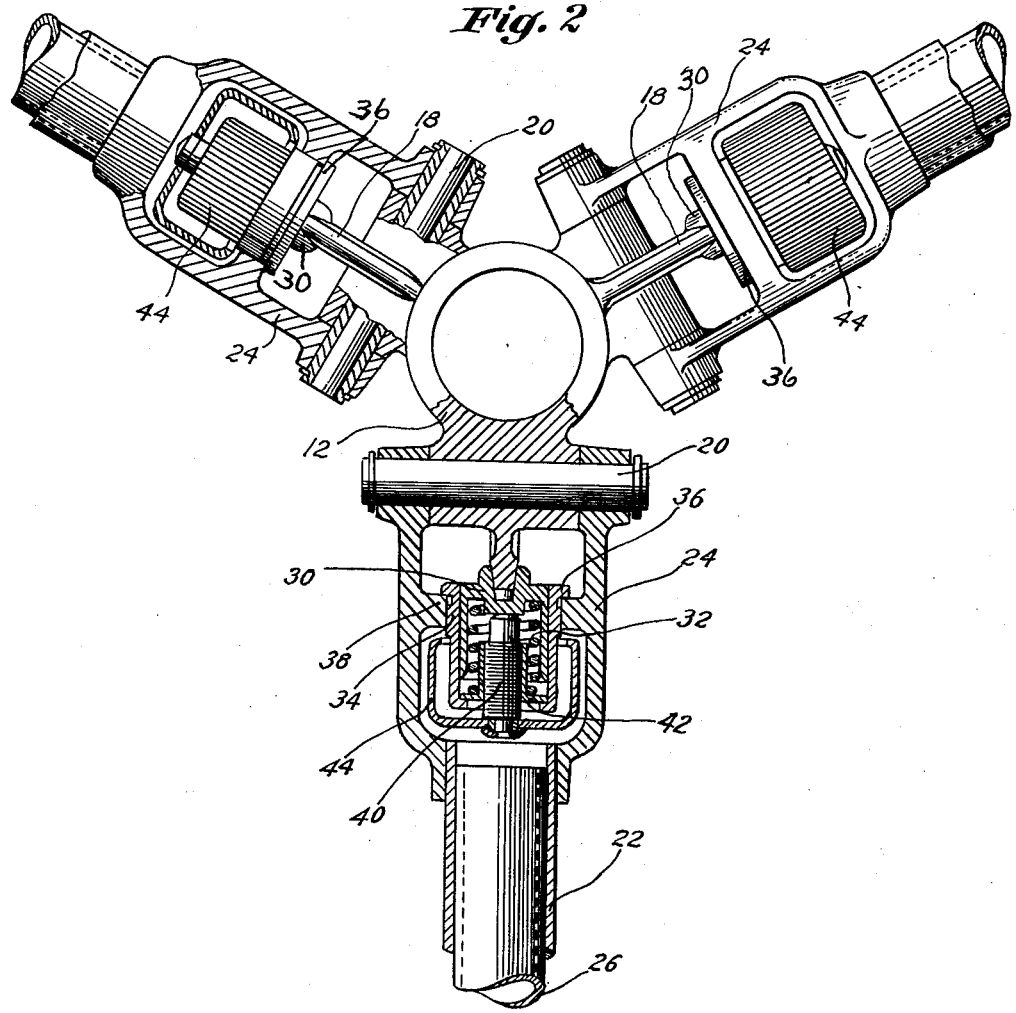

In the drawings:

Fig. 1 is a side elevation of a tripod support made according to the present invention, parts being shown in section to more clearly disclose their construction; and Fig. 2 is a plan view of the tripod adjusting means shown in Fig. 1, a part of the figure being taken on the planes of broken line 2—2 in Fig. 1.

In the above mentioned drawings, there has been shown but one embodiment of the invention which is now deemed preferable but it is to be understood that changes and modifications may be made within the scope of the appended claims without departing from the spirit of the invention.

Briefly, and in its preferred aspect, the invention may include the following principal parts: First, a central casting having three equally spaced arcuate projections extending in spaced vertical planes; second, individual horizontally extending shafts extending centrally through said projections; third, yoke members pivotally mounted on said shafts; fourth, leg members secured to and extending from said yoke members; fifth, engaging members resiliently and movably mounted in said yoke members, and having notched or bifurcated ends engaging the opposite side surfaces of said arcuate members; sixth, spring means normally but lightly forcing said engaging members respectively into contact with their projections; and seventh, threaded means to tightly force and wedge said engaging members into clamping engagement with said projections.

Referring more in detail to the figures of the drawings it will be seen that the tripod support has a table member 10 supported for angular adjustment and movement about vertical and horizontal axes. To mount the table 10 a central casting or body member 12 is provided within which fits a bushing 14 to which is threaded the lower end of the vertical shaft 16 supporting the table 10.

The body member 12 within which the bushing 14 fits has three vertically disposed projections 18 equally spaced apart and being circular in outline. Centrally through each of these projections 18 is a horizontal hole through which extend shafts 20 forming pivots for the angularly adjustable legs 22.

Fitting over the ends of each of the pivots or shafts 20 is a yoke member 24 to which at its free end is attached the upper member 22 of one of the supporting legs. Each leg may have a lower telescoping member 26 slidable within the upper end 22 and provided at its lower end with a suitable projection 28 or prong which may be forced into the ground.

The legs 22—26 may be angularly adjusted about the axis of their pivot shaft 20 and normally are retained in adjusted angular position by a resiliently mounted member 30 housed within the yoke member 24. This engaging member 30 at its inner or upper end is slotted as shown in Fig. 2 so that the sides of the slot engage the opposite sides of the arcuate projection 18. As will be seen in Fig. 2 the sides of the projection 18 are wedge shaped to frictionally bear against the sides of the slot formed in the engaging member 30. To force the engaging member 30 in a direction to force its slotted inner end against the sides of the arcuate projection 18 a spring 32 is housed within a cup shaped member 34 retained in position within the yoke member 24 by a flange 36 on its inner end engaging over a diaphragm 38 formed in the yoke member 24. The spring 32 therefore normally urges the forked end of the engaging member 30 strongly into contact with the arcuate projection 18 with a wedging action which serves to retain a leg in any angularly adjusted position but permits manual adjustment of the legs.

When the tripod has been positioned as desired, it frequently is necessary or desirable to clamp the legs 22—26 in their adjusted angular positions. For that purpose means are provided to firmly engage the notched end of the engaging member 30 with the sides of the arcuate projection 18. Within the engaging member 30 is a screw 40 the inner end of which presses against a surface of the engaging member 30. This screw 40 along its threaded length engages a threaded sleeve 42 housed within the cup member 34 within which the engaging member 30 slides. The sleeve 42 is retained against rotation within the cup member 34 and the screw 40 may be rotated relative to the sleeve 42 yoke member 24 by a knob 44 secured to the outer end of the screw 40. By rotation of the screw 40 the engaging member 30 may be forced into a position to wedge the notched end of the engaging member against the side surfaces of the arcuate projection 18.

When the screw 40 is retracted the leg will be unclamped but still will be frictionally retained by the spring 32 continuing to force the engaging member 30 resiliently against the arcuate projection 18.

As shown in dotted lines in Fig. 1 the legs 22—26 may be swung to positions shown in dotted lines. With the legs in this position the support may be completely inverted and the table 10 be in upside down position between the legs. So adjusted a camera may be positioned very close to the ground, with the lens mounting extending between any two of the legs.

In this inverted position of the table and support 16 the yokes 24 may be clamped in position by forcing the engaging members 30 against another portion of the arcuate projections 18 in the same manner as when the support is in its conventional position.

I claim as my invention:

1. A tripod support comprising, a central member, spaced vertically disposed arcuate projections on said central member, said projections having wedge shaped sides angularly adjustable legs pivotally mounted on said central member, resiliently mounted members in said leg members resiliently forced toward and frictionally engaging against the side surface of said arcuate projection, and supplemental means to force said members firmly into contact with said wedge shaped side surfaces.

2. A tripod support comprising, a central member, spaced vertically disposed arcuate projections in said central member, said projections having wedge shaped sides pivots extending centrally and horizontally through said projections, legs mounted on said pivots, resiliently mounted engaging members slidable with said legs normally forced toward said projections and frictionally bearing against opposite sides of said arcuate projections, and threaded means to force said engaging members firmly into contact with the wedge shaped sides of said projections.

3. A tripod support comprising, a central member, spaced vertically disposed arcuate projections on said central member, shafts extending centrally and horizontally through said projections, yoke members pivotally mounted on said shafts, legs secured to said yoke members, wedging members resiliently and slidably mounted within said yoke members said wedging members having forward notched ends adapted to frictionally engage against the opposite angularly disposed side surfaces of said arcuate projections, resilient means to normally force said wedging members against said projections and threaded means to force the notched ends of said wedging members into wedging engagement with said arcuate projections in any angular adjustment of said legs to firmly clamp said legs in any adjusted position.

References Cited in the file of this patent

UNITED STATES PATENTS

| Number | Name | Date |
|---|---|---|
| 413,118 | Warner | Oct. 15, 1889 |
| 2,204,013 | Gaidos | June 11, 1940 |
| 2,240,091 | Cerne | Apr. 29, 1941 |
| 2,244,089 | Swartz | June 3, 1941 |
| 2,297,927 | Whitman | Oct. 6, 1942 |
| 2,326,552 | Morse | Aug. 10, 1943 |

FOREIGN PATENTS

| Number | Country | Date |
|---|---|---|
| 309,861 | Italy | July 19, 1933 |